United States Patent [19]

Soehngen et al.

[11] 4,057,607
[45] Nov. 8, 1977

[54] PROCESS FOR PREPARING SHEAR DEGRADABLE PARTICLE-CONTAINING RESIN POWDERS

[75] Inventors: John W. Soehngen, Berkeley Heights; Martin J. Hannon, Martinsville, both of N.J.

[73] Assignee: Celanese Corporation, New York, N.Y.

[21] Appl. No.: 642,415

[22] Filed: Dec. 19, 1975

[51] Int. Cl.² .................................................. C08K 3/08
[52] U.S. Cl. .................................. 264/28; 260/42.22; 264/75; 264/108; 264/111; 264/141; 264/211; 264/349; 427/195; 264/323
[58] Field of Search ............... 264/140, 141, 73, 75, 264/6, 108, 109, 111, 118, 175, 240, 245, 211, 349, 171, 323, 28; 260/42.22; 425/207, 205; 427/195

[56] References Cited

U.S. PATENT DOCUMENTS

| | | | |
|---|---|---|---|
| 2,857,354 | 10/1958 | Fang | 260/32.8 EP |
| 3,354,115 | 11/1967 | Brandle et al. | 260/42.22 |
| 3,384,693 | 5/1968 | Roe, Jr. | 264/349 |
| 3,389,105 | 6/1968 | Bolger | 260/42.22 |
| 3,608,013 | 9/1971 | Ingham | 264/171 |
| 3,725,340 | 4/1973 | Erdmenger et al. | 264/176 R |
| 3,730,930 | 5/1973 | Labana | 260/836 |
| 3,737,401 | 6/1973 | Tsou et al. | 260/96 R |
| 3,739,049 | 6/1973 | Honjo | 264/14 |
| 3,770,848 | 11/1973 | Labana | 260/836 |
| 3,803,111 | 4/1974 | Munro et al. | 260/89.5 S |
| 3,817,675 | 6/1974 | Maiocco | 425/207 |
| 3,939,114 | 2/1976 | Camelon et al. | 260/42.22 |

Primary Examiner—Jeffrey R. Thurlow

[57] ABSTRACT

There is disclosed a process for preparing shear degradable particle-containing resin powders. This process comprises (a) preparing a first composition comprising shear degradable particles and molten resin in the absence of high shearing forces on the particles, (b) intimately blending the first composition with a second composition comprising molten resin and curing agent to form a shear degradable particle-containing molten resin mixture in the absence of high shearing forces on the shear degradable particles, (c) solidifying this shear degradable particle-containing molten resin mixture, and (d) grinding the solidified mixture to desired particle size. The particles may then be classified according to particle size.

The final powder particles contain shear degradable particles or flakes in substantially undegraded form. The powder particles are especially useful in powder coating applications such as in automobile and appliance topcoats.

15 Claims, 1 Drawing Figure

U.S. Patent   Nov. 8, 1977   4,057,607
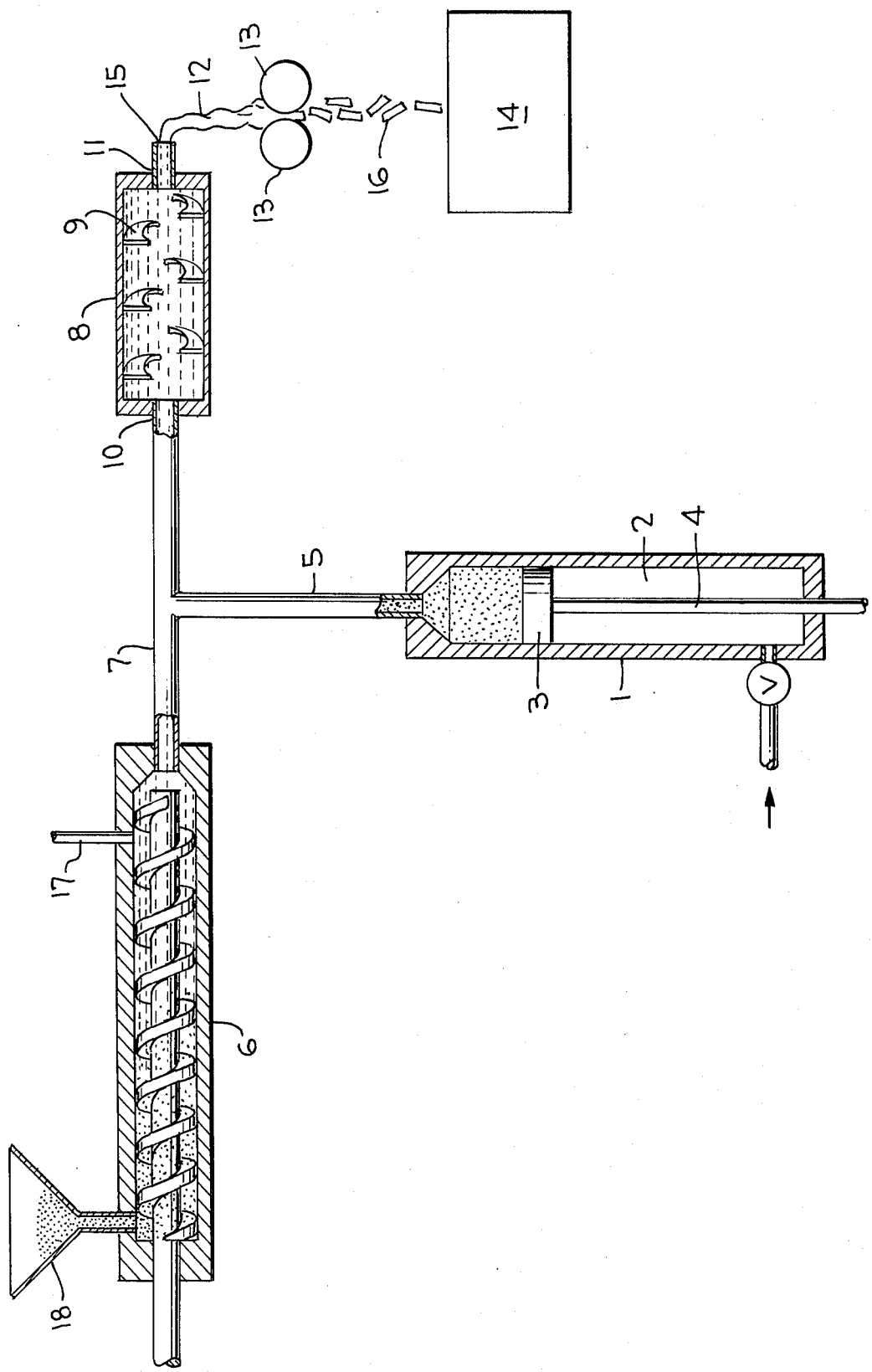

PROCESS FOR PREPARING SHEAR DEGRADABLE PARTICLE-CONTAINING RESIN POWDERS

BACKGROUND OF THE INVENTION

Powder particles which may be used for powder coating applications such as powder painting are advantageous in that they eliminate the disadvantages associated with the use of solvents in liquid paint systems, as for example, the liquid paint system disclosed in U.S. Pat. No. 2,857,354. Powder paint compositions are curable by heat in such a way that little, if any, volatile material is vaporized or evaporated into the environment. This, of course, is substantially different from liquid paint systems where the liquid paint vehicle is volatilized during the drying of the paint.

Processes for preparing powders for various applications are disclosed, for example, in U.S. Pat. Nos. 3,737,401, 3,730,930, and 3,770,848.

It is known that metal particles or flake such as aluminum flake tend to be shear degradable. In the production of shear degradable particle-containing powder particles in general, and in the production of metal particle-containing powder particles in particular, there has been a problem in the past with degradation of the shear degradable ingredient. Since the shear degradable ingredient may be used primarily for decorative purposes (e.g., the use of aluminum flake in automobile top coats, where it is necessary that the finish have a metallic look), any degradation of the shear degradable ingredient presents a serious aesthetic problem.

It is known to produce metal particle-containing powder particles by grinding metal particle-containing resin sheets to form pellets. However, this grinding operation tends to degrade the metal particles contained within the resin.

A prior art method for preparing metal particle-containing powder particles is disclosed, for example, in U.S. Pat. No. 3,739,049. A particularly efficacious method is disclosed in U.S. Pat. No. 3,803,111 wherein such powder particles are prepared by spray-drying acrylic polymer solutions.

The search has continued for improved processes for preparing shear degradable particle-containing resin powders wherein the shear degradable particles remain substantially undegraded within the resin. This invention was made as a result of that search.

OBJECTS AND SUMMARY OF THE INVENTION

Accordingly, a general object of the present invention is to avoid or substantially alleviate the above problems of the prior art.

A more specific object is the provision of a process for preparing shear degradable particle-containing powder particles.

It is a further object of the present invention to provide a process for preparing shear degradable particle-containing powder particles wherein the shear degradable ingredient remains substantially undegraded both during and after the process.

Other objects and advantages of the present invention will become apparent from the following summary and description of the preferred embodiments of the present invention.

The present invention provides a process for preparing shear degradable particle-containing powder particles. This process comprises (a) preparing a first composition comprising shear degradable particles and molten resin in the absence of high shearing forces on the shear degradable particles, (b) intimately blending said first composition with a second composition comprising molten resin and curing agent to form a shear degradable particle-containing molten resin mixture in the absence of high shearing forces on the shear degradable particles, (c) solidifying this shear degradable particle-containing molten resin mixture, and (d) grinding the solidified mixture to desired particle size.

The essence of the present invention is the intimate blending of the shear degradable particle-containing molten resin stream into the main melt stream (comprising molten resin and curing agent) in the absence of high shearing forces on the shear degradable particles. This enables the shear degradable particles to be introduced into the molten resin in a substantially undegraded form.

BRIEF DESCRIPTION OF THE DRAWING

The drawing represents a schematic diagram of the process of the present invention.

DESCRIPTION OF THE PREFERRED EMBODIMENTS

As indicated hereinabove, the first step of the present invention comprises preparing a first composition comprising shear degradable particles and molten resin, and the second step comprises intimately blending this first composition with a second composition comprising molten resin and curing agent to form a shear degradable particle-containing molten resin mixture in the absence of high shearing forces on the shear degradable ingredient.

The resin which is employed in the process of the present invention is used to provide the solid matrix which surrounds the shear degradable ingredient. Any resin which is melt extrudable and which will cure in the presence of a curing agent at a particular minumum temperature (as discussed hereinbelow) to form a suitable coating such as an automobile or home appliance topcoat may be used in the present process.

Such resins include polymeric acrylics, polyepoxies, polyesters, polyolefins, polyamides, polyethers, vinyl resins, cellulosic esters, polyacetals, polyurethanes, silicones, and alkyd resins. If flame retardant properties are desired, these resins should be halogenated, i.e., contain halogen (e.g., bromine and/or chlorine) substitution within the polymer molecules.

It should be readily apparent to those skilled in the art that the polymers suitable for use in the present invention include both thermoplastic and thermosetting polymers. Since the methods of preparing these polymers are so well known in the art, no discussion of such methods need be presented herein.

Acrylic polymers are particularly preferred in the process of the present invention. The term acrylic resin as used herein includes any polymer, whether thermosetting or thermoplastic, which is prepared by the free-radical addition polymerization of one or more ethylenically unsaturated monomers, at least 50 weight percent of which is selected from the group consisting of acrylic and methacrylic acid, alkyl, cycloalkyl, and aralkyl esters of acrylic and methacrylic acids, wherein the ester moiety contains from 1 to about 18 carbon atoms, and the hydroxyalkyl esters of acrylic and methacrylic acids, wherein the hydroxyalkyl moiety contains from 2 to about 10 carbon atoms.

Examples of suitable alkyl, cycloalkyl, aralkyl, and hydroxyalkyl esters of acrylic and methacrylic acids include, among others, methyl acrylate, ethyl acrylate, isopropyl acrylate, n-butyl acrylate, t-butyl acrylate, 2-ethylhexyl acrylate, dodecyl acrylate, octadecyl acrylate, methyl methacrylate, n-butyl methacrylate, 2-ethylhexyl methacrylate, octyl methacrylate, tridecyl methacrylate, hexadecyl methacrylate, cyclohexyl acrylate, cyclohexyl methacrylate, benzyl acrylate, benzyl methacrylate, isobornyl acrylate, isobornyl methacrylate, beta-hydroxyethyl acrylate, beta-hydroxyethyl methacrylate, beta-hydroxypropyl acrylate, beta-hydroxypropyl methacrylate, gamma-hydroxypropyl methacrylate, beta-hydroxybutyl acrylate, gamma-hydroxybutyl methacrylate, delta-hydroxybutyl acrylate, beta-hydroxyoxtyl acrylate, and beta-hydroxydecyl methacrylate.

The remaining 50 weight percent or less of said ethylenically unsaturated monomers consists of at least one monomer selected from the group consisting of:

1. acrylic monomers other than those cited hereinabove, which monomers generally encompass aryl and reactive esters of acrylic and methacylic acids, such as phenyl acrylate, phenyl methacrylate, aziridinyl acrylate, glycidyl methacrylate, 2-aminoethyl acrylate, 2-aminopropyl methacrylate, 3-aminopropyl methacrylate, and the like;

2. ethacrylic and crotonic acids and esters thereof, such as ethyl ethacrylate, methyl crotonate, octyl ethacrylate, heptyl crotonate, octadecyl ethacrylate, cyclohexyl ethacrylate, benzyl crotonate, phenyl ethacrylate, and the like;

3. amides, alkylol amides, and alkoxyalkyl amides of acrylic, methacrylic, and crotonic acids, wherein the alkyl moieties contain from 1 to about 4 carbon atoms and the alkoxy moiety contains from 1 to about 8 carbon atoms, specific examples being acrylamide, methacrylamide, crotonamide, methylol acrylamide, methoxymethyl methacrylamide, butoxymethyl acrylamide, 2-ethylhexoxymethyl methacrylamide, diacetone acrylamide, and the like;

4. alpha, beta-ethylenically-unsaturated dicarboxylic acids and anhydrides, such as maleic acid, maleic anhydride, fumaric acid, itaconic acid, mesaconic acid, and the like;

5. mono- and diesters of alpha, beta-ethylenically-unsaturated dicarboxylic acids, examples of which esters are fumaric acid monoethyl ester, dimethyl itaconate, dipropyl mesaconate, diisopropyl maleate, dicyclohexyl maleate, maleic acid mono (beta-hydroxyethyl) esters, and the like;

6. alpha, beta-ethylenically-unsaturated nitriles, such as acrylonitrile, methacrylonitrile, ethacrylonitrile, crotonic nitrile, and the like;

7. vinyl aromatic compounds, such as styrene, vinyltoluene, vinylnaphthalene, chlorostryene, bromostyrene, and the like;

8. monounsaturated hydrocarbons, such as ethylene, propylene, and the like;

9. no more than about 10 weight percent of vinyl esters of alphatic monocarboxylic acids having from 1 to about 18 carbon atoms, such as vinyl acetate, vinyl propionate, vinyl octanoate, vinyl stearate, and the like; and 10. no more than about 10 weight percent of halogen-containing unsaturated hydrocarbons, such as vinyl chloride, vinyl fluoride, vinylidene chloride, vinylidene fluoride, and the like.

Mixtures of two or more such resins may also be used as long as the resins are melt compatible.

As indicated hereinabove, the resin is used in both the first and second compositions which are blended together. In the first composition (comprising molten resin and the shear degradable particles), the resin may be present in an amount of generally from about 50 to about 95, typically from about 60 to about 90, and preferably from about 75 to about 85 percent by weight of the first composition. In the second composition (comprising molten resin and curing agent), the resin may be present in an amount of generally from about 55 to about 95, typically from about 60 to about 90, and preferably from about 65 to about 85 percent by weight of the second composition.

The final shear degradable particle-containing powder particles may contain generally from about 60 to about 95, typically from about 70 to about 90, and preferably from about 80 to about 85 percent by weight resin based upon the weight of the final powder particles.

By the terms "shear degradable particle" and "shear degradable ingredient" as used in the instant specification is meant any metal-containing composition or other composition similarly susceptible to attrition which is useful in a topcoat, for example, for automobiles, home appliances, etc. Such shear degradable particles include aluminum flake, bronze flake, zinc flake, magnesium flake, copper flake, gold flake, silver flake, platinum flake, mica, glass, brass, stainless steel, coated mica, coated glass, glass beads, and aluminum-coated polyester film fragments. Mixtures of two or more shear degradable particles may also be used. Aluminum flake is a preferred shear degradable particle for use in the present invention.

The shear degradable particles may be in any form, e.g., particle or flake. Flake is preferred because of the better reflectance properties of flake.

The shear degradable particles are present in the first composition in an amount of generally from about 5 to about 50, typically from about 10 to about 40, and preferably from about 15 to about 25 percent by weight of the first composition. The shear degradable particles are present in the final powder particles in an amount of generally from about 1 to about 40, typically from about 1.5 to about 25, and preferably from about 2 to about 15 percent by weight of the final powder particles.

When the shear degradable particles or flakes employed in the process of the present invention are metal particles or flake, they tend to impart to the surfaces to which the particles are applied a metallic finish or effect. These metal particles remain substantially undegraded in the final powder particles and thus provide an improved metallic finish when applied to surfaces such as the exterior of an automobile or home appliances.

The curing agent employed in the process of the present invention is used to cure or cross link the resin after it has been applied to the coated surface. Any curing agent which is not activated until a certain critical minimum temperature is reached, but which, at that minimum temperature, and at temperatures in excess of that minimum, is activated so as to cure or cross link the resin of the shear degradable particle-containing powder particles may be used in the present process.

Thus, for example, in using the shear degradable particle-containing powder particles of the present invention as a paint, the particles may be first applied (e.g., electrostatically) to a surface and then the coated surface is heated or baked so as to activate the curing agent and thereby cross link the resin.

Typical curing agents include multifunctional isocyanates such as toluene isocyanate, polyols, polycarboxylic acids, hydroxylcarboxylic acids, polyamines, hydroxylamines, and other compounds known to those skilled in this art.

A particularly preferred curing agent comprises a blocked triisocyanate, prepared by reacting three moles of 1-isocyanato-3-isocyanatomethyl-3,5,5-trimethylcyclohexane with one mole of 1,1,1-tris-(hydroxymethyl) propane in methyl isobutyl ketone followed by blocking with methyl ethyl ketoxime.

The curing agent may be present in small amounts, generally from about 2 to about 60, typically from about 10 to about 40, and preferably from about 15 to about 35 percent by weight of the second composition.

The shear degradable particle-containing powder particles of the present invention may also contain a pigment or dye if additional color is desired in the final powder particles. The pigment or dye is not soluble in the resin melt but is finely pulverized and thus in homogeneous suspension throughout the melt. The pigments or dyes useful in the present invention include carbon black, cadmium red, phthalocyanine blue, toluidine red, iron oxide, calcium carbonate, barium sulfate, and titanium dioxide.

The pigment may be added to either the first (molten resin and shear degradable particles) or to the second composition (i.e., molten resin and curing agent) or both. The pigment is preferably added to both the first and second compositions by forming a pigment concentrate, i.e., a mixture of molten resin and pigment particles. This mixture generally contains about 50 percent by weight pigment. The pigment is used in small amounts, generally from about 1 to about 20 typically from about 1 to about 10 and preferably from about 1 to about 5 percent by weight based upon the weight of the first composition and generally from about 1 to about 20 typically from about 1 to about 10 and preferably from about 1 to about 5 percent by weight based upon the weight of the second composition.

Other additives and mixtures thereof may also be used in minor amounts in the present invention. Such additives include stabilizers (e.g., dibutyltin dilaurate, ethylene oxide, alkylated phenols and bisphenols, barium-cadmium powders, epoxy resins), plasticizers (e.g., dioctyl phthalate, 2-ethylhexyl phthalate, diisobutyl adipate, diisooctyl azelate), flow control additives (the 75/25 copolymer of 2-ethylhexyl acrylate and ethyl acrylate, the 77.5/22.5 copolymer of n-nexyl acrylate and isodecyl acrylate), dispersants, flow control agents, and many others known to those skilled in this art. These additives are present in amounts generally less than about 5, typically less than about 2, and preferably less than about 1 percent by weight of the final powder particles.

In order to avoid degradation of the shear degradable particles or flakes, it is necessary that the first composition be blended with the second composition in the absence of high shearing forces on the shear degradable ingredient. Thus, the first composition (i.e., shear degradable particles and molten resin) may be premixed by blending the shear degradable particles with the molten resin and then charging this mixture to an extruder which exerts little shear force on the shear degradable particles or flakes.

In this specification, by the term "high shear forces" is meant those forces which shear degradable particles might experience in an melt screw extruder such as a Werner-Pfleiderer ZSK melt screw extruder. The term "high shear forces" thus does not apply to those forces which shear degradable particles might experience in a piston extruder since a piston extruder exerts comparatively little shear force.

The shear degradable particle-containing molten resin mixture may be extruded through a piston extruder, i.e., an extruder which comprises a cylinder with a slidable piston and a motor driven ram device. A single acting piston extruder may be used as described in the Drawing, but for continuous operation, there may be employed a double acting piston extruder.

The residence time of the first composition in the piston extruder may be generally from about 5 to about 400, typically from about 8 to about 380, and preferably from about 10 to about 360 minutes.

The temperature within the piston extruder must be high enough to keep the resin molten but not high enough to decompose the resin. The temperature employed may be generally from about 110° to about 140°, typically from about 115° to about 135°, and preferably from about 120° to about 130° C.

On the other hand, the second composition (i.e., molten resin and molten curing agent) may be subjected to shearing forces such as those experienced in a screw extruder such as a melt screw extruder. Such melt screw extruders include a Werner-Pfleiderer ZSK twin screw extruder, a Baker-Perkins (65 and 150 RPM) extruder and a single screw MPM extruder.

The residence time of the second composition in the melt screw extruder may be generally from about 2 to about 30, typically from about 3 to about 15, and preferably from about 4 to about 10 minutes.

The temperature within the melt screw extruder must be high enough to keep the resin molten but not high enough to decompose the resin. The temperature employed may be generally from about 100° to about 130°, typically from about 105° to about 125°, and preferably from about 110° to about 120° C.

The first and second compositions may be blended under non-shear conditions as, for example, in a static mixer such as a Kenic, Ross, or Koch static mixer.

A Kenic static mixer is essentially a section of pipe containing a set number of helical elements. Each element splits the flow and the total number of flow splits is $2^n$ where n is the number of elements in the static mixer. The Ross static mixer includes elements having holes drilled at different angles to redirect the flow of material between elements. In a conventional Ross static mixer, for example, the usual number of elements is 21 but in the present invention it is possible to use a smaller number of elements, for example, three, six or 12. The Koch static mixer includes corrugated sheets with alternating directions in flow between the layers of sheets.

The intimate blending of the first and second compositions in the static mixer must take place at a temperature high enough to keep the resin molten but low enough so as to avoid the activation of the curing agent or the decomposition of the resin. Thus, the blending step may be conducted at a temperature of generally from about 100° to about 135°, typically from about 105° to about 130°, and preferably from about 110° to about 125° C.

The residence time of the combined first and second compositions within the static mixer may be generally from about 1 to about 10, typically from about 1.5 to about 6, and preferably from about 2 to about 4 minutes.

After the two compositions are intimately blended together, the shear degradable particle-containing molten mixture may be solidified by either passing the molten mixture through a nozzle or by extruding it through an orifice such as a cylindrical hole, rectangular slit or other shaped orifice which may be attached to the static mixer. This hole or orifice, if cylindrical, may have a diameter of generally from about 0.025 to about 1, typically from about 0.05 to about 0.5, and preferably from about 0.075 to about 0.25 inches.

The extruded molten segments may then be either quenched in a liquid bath or alternatively passed through chill rolls. The liquid bath may contain any liquid which is a non-solvent, or is only a very poor solvent, for the resin used in the present invention. Such liquids include water, isopropanol, glycerine, and hexane. Water is a preferred liquid.

The temperature of the quench bath or chill rolls should be low enough to solidify the molten resin. Thus, temperatures of generally from about 0° to about 60°, typically from about 15° to about 35°, and preferably from about 20° to about 30° C may be employed.

After quenching either in the liquid bath or by chill rolls, the solid strands of shear degradable particle-containing resin may be ground to desired particle size. This grinding may be either by a wet or dry process.

In the wet grinding method, the solid segments are placed in a Waring blender with generally from about 1 to about 20, typically from about 3 to about 15, and preferably from about 5 to about 10 percent by weight water based on the weight of the total composition (i.e., solid segments and water). This mixture is then subjected to agitation so that the solid segments are broken up into particles. These particles may then be dried and classified.

Alternatively, the solid segments in the quench bath may be dry ground. In the dry grinding method, the solid segments are first air dried and then put into a Majac grinder and classifier wherein the particles are broken by impinging them against a flat plate. These particles are then classified according to particle size.

A preferred commercial method for quenching, drying, grinding and classifying these particles is to extrude the molten strands from the static mixer through chill rolls so that the molten strands become solid, then to air cool these strands as they pass from the chill rolls to the Majac grinder and classifier.

The wet particles are dried at a temperature high enough to evaporate any liquid from the quench bath but not so high as to decompose the resin or activate the curing agent. This temperature may be generally from about 40° to about 90°, typically from about 50° to about 85°, and preferably from about 60° to about 80° C.

The final powder particles have a mean average diameter of generally from about 30 to about 100, typically from about 40 to about 80, and preferably from about 50 to about 65 microns and a particle size range of generally from about 10 to about 150, typically from about 20 to about 100, and preferably from about 30 to about 70 microns.

The entire process may be conveniently conducted at any pressure, subatmospheric, atmospheric, or superatmospheric but substantially atmospheric pressure is preferred.

The present invention is further illustrated by the following example. All parts and percentages in the examples as well as in the specification and claims are by weight unless otherwise specified.

EXAMPLE

This example illustrates the preparation of metal containing powder particles. This example will be explained in connection with the Drawing.

The amounts of the various materials used in this example are listed in Table I below.

TABLE I

|  | Weight (in grams) | Parts by Weight |
|---|---|---|
| Composition A |  |  |
| poly (methyl methacrylate) | 468 | 82.5 |
| aluminum flake | 85 | 15.0 |
| pigment concentrate* | 14.3 | 2.5 |
| Composition B |  |  |
| poly (methyl methacrylate) | 2,710 | 65.1 |
| pigment concentrate* | 123 | 3.0 |
| curing agent** | 1,328 | 31.9 |

*The pigment concentrate is a 50/50 by weight blend of phthalocyanine blue pigment (copper phthalocyanine) and the poly (methyl methacrylate) resin. This concentrate is prepared by melt milling the pigment and the resin on heated Bombury milling rolls in order to get a good dispersion of the pigment. After cooling the milled mixture, it is ground into fine particles.
**The curing agent is prepared by reacting 3 moles of 1-isocyanate-3-isocyanatomethyl-3,5,5-trimethylcyclohexane with one mole of 1,1,1-tris-(hydroxymethyl) propane in methyl isobutyl ketone followed by blocking with methyl ethyl ketoxime.

This entire process is conducted at substantially atmospheric pressure.

The aluminum flake is premixed with the poly (methyl methacrylate) (composition A) in a heated stainless steel beaker at about 120° C for about 1 hour with gentle stirring, and this composition is then charged to the piston extruder 1 which comprises a cylinder 2 which contains a slideable piston 3 and a motor driven ram device 4.

The wall temperature of the piston extruder is 130° C and composition A is present within this extruder for 6 hours. The aluminum flake and molten polymer are extruded through line 5 and blended with the output from the melt screw extruder 6.

Composition B is dry blended by tumbling the three components in a sealed container for about 0.5 hours. This mixture is then added to a Werner-Pfleiderer ZSK melt screw extruder 6 at a temperature of about 115° C for a residence time of about 8 minutes. The mixture is thoroughly mixed in the extruder and the resin and curing agent are melted. This mixture is then extruded from the melt screw extruder through line 7 and is thoroughly blended with the extrudate from the piston extruder in a Ross static mixer 8 which contains flow splitting elements 9 and has an inlet end 10 and outlet end 11. The static mixer is approximately 8 inches long, has an inner diameter of 1 inch and is equipped with 6 flow splitting elements.

The molten mixture of composition A and composition B has a residence time within the static mixer of 3.5 minutes. The temperature within the mixer is 120° C.

This molten mixture is then extruded through a 0.25 inch diameter orifice 15 into a set of chill rolls 13. The molten segments 12 thus become solid segments 16 which are air dried and then sent to a Majac grinder and classifier 14.

The final metal-containing powder particles have a mean average diameter of about 60 microns and a particle size range of from about 30 to about 70 microns.

As indicated hereinabove, the metal-containing particles of the present invention are useful generally in powder applications, and especially in powder painting. These particles are particularly useful when it is desired to produce metal-containing particles wherein the metal particle or flake is substantially undegraded.

The extent of aluminum flake degradation is illustrated in Table II below.

TABLE II

| Run No. | Initial Average Metal Particle Size (area $\mu m^2$) | Unground Extrudate area ($\mu m^2$) | % degradation | Wet Ground Products area ($\mu m^2$) | % degradation |
|---|---|---|---|---|---|
| 1 | 249 | 177 | 28.9 | 104 | 58.2 |
| 2 | 194 | 187 | 3.6 | 127 | 34.5 |

In this specification, the "percent degradation" is defined as follows:

$$\% \text{ degradation} = \frac{[\text{initial average metal particle size} - \text{final average metal particle size}]}{\text{initial average metal particle size}} \times 100$$

COMPARATIVE EXAMPLE

Example I is repeated but instead of extruding composition A from a piston extruder, either all the ingredients are dry mixed together and added to a Baker-Perkins twin screw extruder (run 3), or the aluminum flake/solid resin mixture is added as a dry powder to the vent port 17 of a Werner-Pfleiderer ZSK twin screw extruder 6, thus mixing with molten resin and curing agent which are added through hopper 18 of the melt screw extruder (runs 4 and 5).

The results are tabulated below in Table III.

TABLE III

| Run No. | Initial Average Metal Particle Size (area $\mu m^2$) | Unground Extrudate Area ($\mu m^2$) | % Degradation | Wet Ground Product Area ($\mu m^2$) | % Degradation |
|---|---|---|---|---|---|
| 3 | 151 | 15 | 90.1 | 10 | 93.4 |
| 4 | 244 | 31 | 87.3 | 35 | 85.7 |
| 5 | 220 | 62 | 71 | 41 | 81.4 |

It should be noted that in run 4, the percent degradation for the unground extrudate is less than it is for the wet ground product. This is probably the result of failing to get a good sample of particles which have a wide range of particle sizes.

A comparison of runs 1 through 5 indicates that the greatest degradation (over 90 percent for both the unground extrudate and the wet ground product) takes place when all the ingredients are dry mixed together in the melt screw extruder (run 3). Considerable degradation (more than 70 percent for the unground extrudate and more than 80 percent for the wet ground product) also occurs when the aluminum/solid resin is added through the vent port of the melt screw extruder and is mixed with molten resin and curing agent (runs 4 and 5).

On the other hand, when the metal particles are treated according to the process of the present invention (runs 1 and 2), considerably less degradation (less than 30 percent for the unground extrudate and less than 60 percent for the wet ground product) occurs. Thus, the present invention provides a method for preparing metal containing powder particles without degrading the metal particles to a considerable extent.

The area measurements reported in Table II and Table III in square micrometers (i.e., $\mu m^2$) were made with the aid of Quantimet 720 image analyzing computer available from Imanco, Inc. of Muncie, N.Y. using the standard analysis procedure.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the scope of the invention.

We claim:

1. An improved process for preparing shear degradable particle-containing resin powders which process comprises (a) preparing a first composition consisting essentially of shear degradable particles and molten resin in the absence of high shearing forces on the particles, (b) intimately blending said first composition with a second composition consisting essentially of molten resin and curing agent to form a shear degradable particle-containing molten resin mixture in the absence of high shearing forces on the shear degradable particles and without activating the curing agent, (c) solidifying the shear degradable particle-containing molten resin mixture, and (d) grinding the solidified mixture to desired particle size.

2. The process of claim 1 wherein said first composition is intimately blended with said second composition by extruding the first composition from a piston extruder into a static mixer where the first composition is intimately mixed with the second composition.

3. The process of claim 2 wherein both the first and second compositions each contain a pigment which is added in the form of a pigment concentrate comprising about 50 percent by weight pigments and about 50 percent by weight resin.

4. The composition of claim 3 wherein the final powder particles are classified according to particle size.

5. The process of claim 4 wherein said blending step takes place at a temperature of from about 100° to about 135° C, and wherein said process is carried out at substantially atmospheric pressure.

6. The process of claim 1 wherein the final powder particles have a mean average diameter of from about 30 to about 100 microns.

7. The process of claim 6 wherein said first composition comprises from about 50 to about 95 percent by weight resin and from about 5 to about 50 percent by weight shear degradable particles and wherein said second composition comprises from about 55 to about 95 percent resin, and from about 2 to about 60 percent by weight curing agent.

8. A process for preparing shear degradable particle-containing resin powders which process comprises (a) preparing a first composition consisting essentially of (1) shear degradable metal particles, (2) molten resin, and (3) a pigment concentrate comprising about 50 percent by weight pigment and about 50 percent by weight molten resin, (b) intimately blending said first composition with a second composition consisting essentially of a curing agent and molten resin mixture in the absence of high shearing forces on the shear degradable metal particles and without activating the curing agent, (c) solidifying this shear degradable metal particle-containing molten resin mixture, and (d) grinding the solidified mixture to desired particle size.

9. The process of claim 8 wherein the resin is poly (methyl methacrylate) and the shear degradable metal particles are aluminum flake.

10. The process of claim 8 wherein the final powder particles have a mean average diameter of from about 40 to about 80 mcirons.

11. The process of claim 9 wherein said blending step takes place at a temperature of from about 105° to about 130° C and wherein said process is carried out at substantially atmospheric pressure.

12. The process of claim 11 wherein both the first and the second compositions contain a pigment which is added in the form of a pigment concentrate comprising about 50 percent by weight pigment and about 50 percent by weight resin.

13. The process of claim 12 wherein said first composition comprises from about 60 to about 90 percent by weight resin and from about 10 to about 40 percent by weight shear degradable metal particles and wherein said second composition comprises from about 60 to about 90 percent resin, and from about 10 to about 40 percent by weight curing agent.

14. A process for preparing shear degradable metal particle-containing resin powders which process comprises (a) preparing a first composition consisting essentially of from about 15 to about 25 percent by weight shear degradable aluminum flake and from about 75 to about 85 percent by weight polymeric acrylic resin in the absence of high shearing forces on the shear degradable aluminum flake, (b) intimately blending at a temperature of from about 110° to about 125° C, and at substantially atmospheric pressure, said first composition with a second composition consisting essentially of from about 65 to about 85 percent by weight polymeric acrylic resin, and from about 15 to about 35 percent by weight curing agent to form a shear degradable aluminum flake-containing molten resin mixture, in the absence of high shearing forces on the shear degradable aluminum flake and without activating the curing agent, (c) solidifying this shear degradable aluminum flake-containing molten resin, at a temperature of from about 0° to about 60° C, and (d) grinding the solidified mixture to particles having a mean average diameter of from about 50 to about 65 microns.

15. The process of claim 14 wherein said first composition is intimately blended with said second composition by extruding the first composition from a piston extruder into a static mixer where the first composition is intimately mixed with the second composition.

* * * * *